Sept. 1, 1942. G. R. BENNETT 2,294,560
SLICING MACHINE
Filed May 25, 1940 2 Sheets-Sheet 1
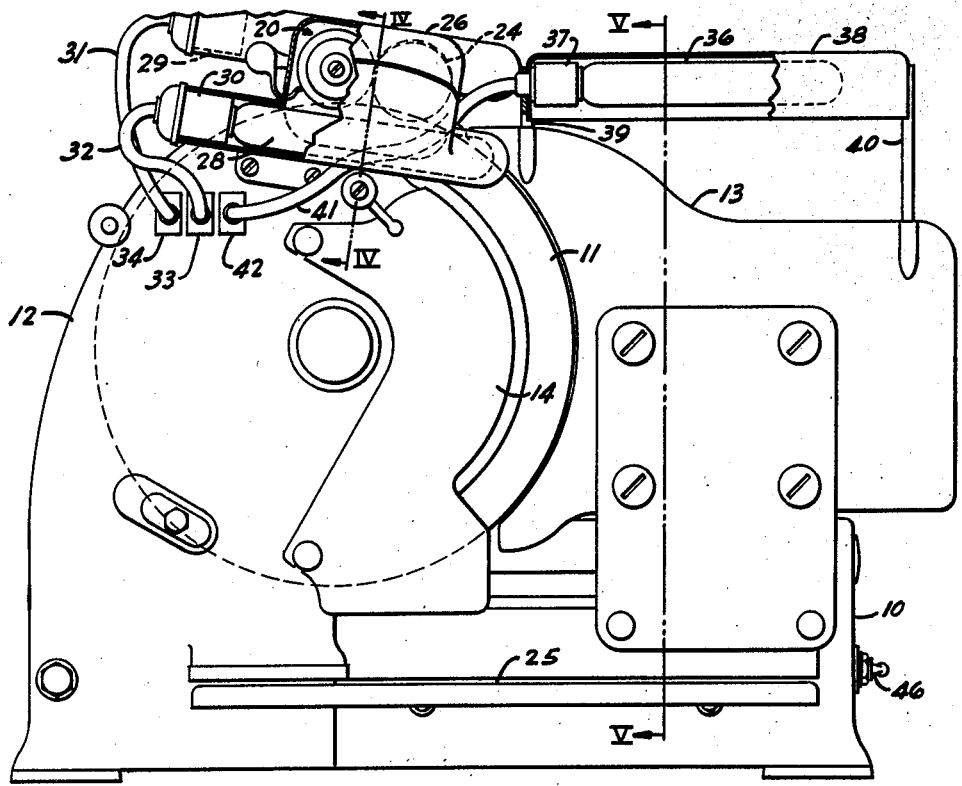
Fig. I
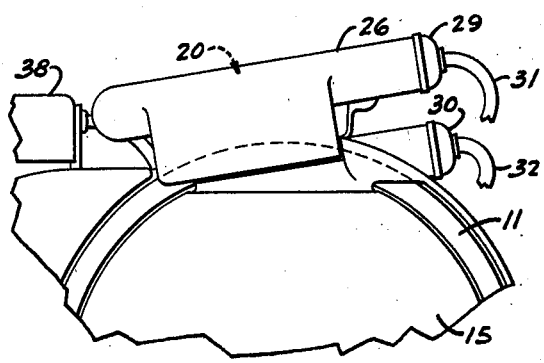
Fig. III
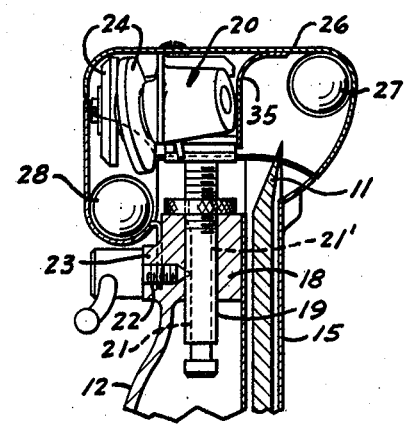
Fig. IV
Geoffrey R. Bennett
INVENTOR
BY Marshall & Marshall
ATTORNEYS Sept. 1, 1942.                G. R. BENNETT                    2,294,560
                              SLICING MACHINE
                           Filed May 25, 1940              2 Sheets-Sheet 2
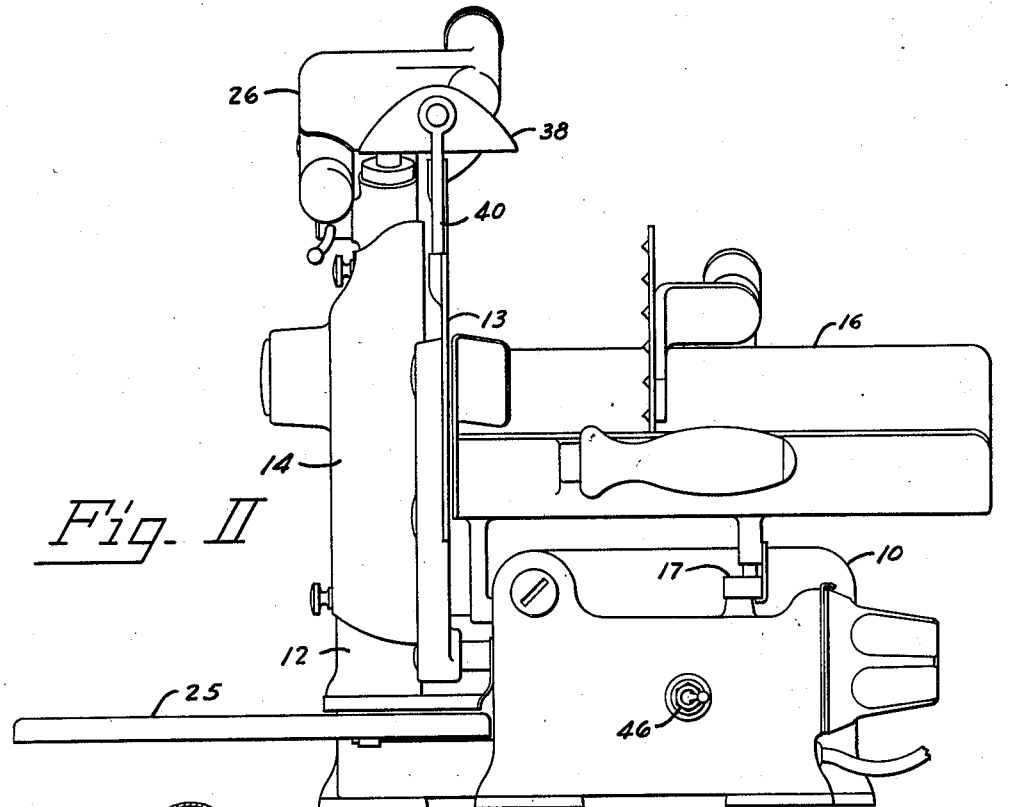
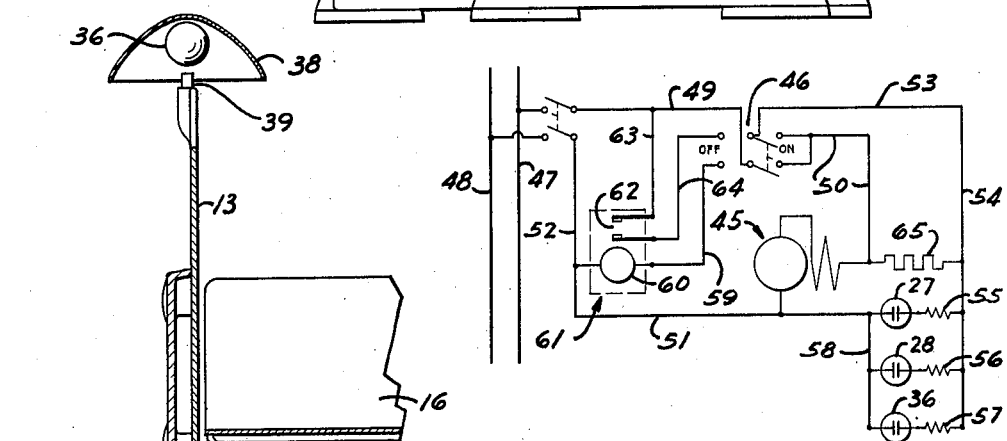
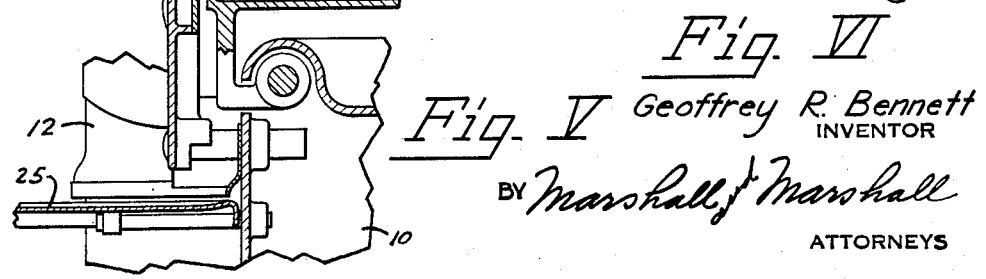
Geoffrey R. Bennett
INVENTOR
BY Marshall & Marshall
ATTORNEYS Patented Sept. 1, 1942

2,294,560

UNITED STATES PATENT OFFICE 2,294,560

SLICING MACHINE

Geoffrey R. Bennett, Toledo, Ohio, assignor to Toledo Scale Company, Toledo, Ohio, a corporation of New Jersey Application May 25, 1940, Serial No. 337,311

5 Claims. (Cl. 146—102)

This invention relates generally to food slicing machines, but more particularly to bactericidal attachments therefor. Slicing machines which are used commonly in food packaging plants and in retail stores are as a rule thoroughly cleaned at the end of the working day but since bacteria and/or mold spores are air-borne they are constantly being deposited upon those parts of the slicing machine which come into contact with the foodstuffs being sliced. Bacteria, which is deposited and adheres to the rotary or other knife of a food slicing machine, is particularly obnoxious since during the slicing operation it is distributed over the cut surfaces. Frequently, sliced products are packaged immediately after slicing, thus enabling the bacteria between the slices to multiply undisturbedly and lead to more rapid deterioration of the same. It has recently been demonstrated that ultra violet radiation within the limits of 2000 and 3000 Angström units has a decided bactericidal action and, therefore, the principal object of this invention is the provision of improved means for sterilizing, by means of ultra violet radiation, such parts of slicing machines as come into contact with the food material being sliced, particularly the knife.

Another object is the provision of improved means for attaching ultra violet ray emitting devices to slicing machines.

Another object is the provision of efficient reflectors which cooperate with such emitting devices to evenly distribute such bactericidal rays; and, Still another object is the provision of improved means for periodically exciting such ultra violet ray emitting devices.

These, and other objects and advantages will be apparent from the following description in which reference is had to the accompanying drawings, illustrating a preferred embodiment of the invention and in which similar reference numerals refer to similar parts throughout the several views.

Referring to the drawings:

Fig. I is an end elevational view of a slicing machine showing generally the arrangement and location of the ultra violet ray emitting tubes.

Fig. II is a front elevation thereof.

Fig. III is a fragmentary end elevational view showing particularly the relative positions of the ray emitting tubes and the slicing knife.

Fig. IV is a cross sectional view substantially along the line IV—IV of Fig. I.

Fig. V is a cross sectional view substantially along the line V—V of Fig. I; and, Fig. VI is a diagram of the electric circuit.

Referring to the drawings in detail:

The slicing machine, for the purpose of illustration, comprises a stationary base 10 containing a motor and means for transmitting power from the motor to a rotary knife 11 which is mounted in a casing-like bracket 12, a portion of the power transmitting means also being located within the casing 12. Since these means are all well known and conventional they are not shown. The knife 11, in the usual manner, is mounted immediately adjacent and in parallel alignment to a gauge plate 13, whose location is adjustable to obtain slices of various thickness, and between a slice deflector plate 14 and a knife shield 15. A substance supporting carriage 16 is, in the usual manner, reciprocatingly mounted upon guides as at 17.

It is well known that for proper work the cutting edge of the disk knife 11 must be very sharp and to enable the operator to maintain this condition there is provided on the upper end of the casing 12 a boss 18. This boss is provided with a bore for the reception of a stem 19 of a knife sharpening attachment 20. The stem 19 is provided with longitudinally extending V grooves 21 and 21' adapted to be entered by the conical point of a screw 22 threaded through a boss 23 on the casing 12 so that this sharpening attachment may be centered in and out of engagement with the knife 11. The attachment 20 comprises a pair of abrasive disks 24 which, normally are out of engagement with the knife 11 but for the purpose of sharpening the blade the position of the attachment 20, after loosening the screw 22, may be reversed by raising and turning it about the axis of its stem 19 and carefully placing the abrasive disks 24 into engagement with the edge of the knife while the knife is revolving.

As previously stated, air borne bacteria and mold spores which accelerate decomposition and spoilage, are constantly being deposited upon all surfaces of the slicing machine. They are, of course, comparatively harmless with the exception of those deposited upon parts which come into contact with the material being sliced, i. e., the carriage 16, knife shield 15, deflector 14, a slice receiving table 25 extending laterally from the base 10 and the knife 11. However, the bacteria or spores on the knife 11 are apt to cause the most damage since the knife in cleaving the material deposits them over extensive portions of the severed areas. These areas furthermore are more sensitive to the action of the bacteria since they have no protection such as is offered by the casing of sausages or the rind and covering pellicle of bacon which, to a great extent, has been immunized by the smoking operation.

In carrying out the present invention a casing 26 of the knife sharpening attachment 20 is so designed and arranged to receive and house a plurality of ultra violet ray emitting lamps 27 and 28, these lamps or tubes are positioned to irradiate both sides of the cutting edge and all surfaces of the knife coming into contact with the material being processed. Suitable sockets 29 and 30 for these lamps are provided within the casing 26 and leads 31 and 32, leading from the sockets 29 and 30 respectively, have pronged connecting plugs 33 and 34 for attachment to a source of current. Since ultra violet rays substantially obey the laws of visible light the interior of the casing 26 is highly polished to form reflecting surfaces. An additional reflector 35 is stationed in the interior of the casing 26 adjacent the lamp 27 to reflect laterally projected rays to the opposite side of the cutting edge of the knife 11. In addition to irradiating a portion of the knife 11 the lamp 28 is positioned to sterilize, with the aid of the interior reflecting surface of the casing 26, the abrasive disks 24.

Since the casing means for the lamps 27 and 28, in this embodiment of the invention, permit only a very small amount of reflected rays to impinge upon the knife shield 15 and slice deflector plate 14 or upon the carriage 16 and the slice receiving table 25, another ultra violet ray emitting tube or lamp 36 is provided. This lamp is held in a socket 37 mounted in the end of a reflector cap 38 which, by means of brackets 39 and 40, is mounted on the upper edge of the gauge plate 13 (see Figures I and V). The shape of the reflector cap 38 is such that such rays from the tube 36, as do not fall directly upon these parts, are reflected thereto. The socket 37 for this tube is connected by means of a lead 41 and a connecting plug 42 to the source of electricity.

Since the bactericidal action of the ultra violet rays, especially those in the region of 2537 Angström units, is very rapid it is not necessary that the irradiation be continuous, the tubes however should be energized whenever the machine is in operation and periodically, for a sufficient length of time, when the machine is idle. To accomplish this, a motor 45 is in an electrical circuit which is energized when a double pole double throw switch 46 is turned to the "on" position (Fig. VI), current now flows from a main power line comprising leads 47 and 48, over a lead 49, the switch 46, lead 50, through the field and rotor coils of the motor 45, which is of the universal type, and through leads 51 and 52 to the other side of the line. This energizes the motor causing it to rotate at its normal speed and through the transmission means the knife is rotated and the machine is in condition to perform its operation. Turning the switch 46 to the "on" position also causes current to flow over leads 53, 54 resistances 55, 56, 47 through ultra violet ray emitting lamps or tubes 27, 28, 36, then through leads 58, 51 and 52 to the other side of the line. These lamps or tubes, which preferably operate on the gaseous discharge principle in an atmosphere of inert gases and mercury vapor, in which the majority of the energy produced is in the region of 2537 Angström units, are now energized and the emitted rays, with the aid of the reflectors, impinge on all surfaces of the parts hereinbefore enumerated to sterilize these and simultaneously activate the ambient air.

Upon termination of the slicing operation the operator turns the switch 46 into the opposite or "off" position. This breaks the previously described circuit, de-energizing the motor 45 and the lamps 27, 28 and 36. Current however now flows from the source over lead 49, switch 46, a lead 59 through a synchronous motor 60 of an electrical timing device 61 and through lead 52 to the other side of the source. This timing device controls a normally open contact 62 and depending upon its adjustment, periodically closes this contact for a predetermined length of time and then again permits it to open. When the contact 62 is closed current flows from the source over lead 49, a lead 63, the contact 62, a lead 64, switch 46, leads 53 and 54 and through a speed reducing resistor 65, and through the motor 45, leads 51 and 52 to the source. This causes the motor 45 to rotate at a slow speed. The energization also causes current to flow through the lamps 27, 28 and 36 and their respective resistances, thus energizing them. The emitted rays impinge upon all the surfaces normally touching the material while the machine is in an unloaded condition and upon the now slowly rotating knife. The timing device is of the kind that may be set to close and open the contacts 62 at desired intervals. It has been found that a fifteen minute interval between energized periods of five minutes each is amply sufficient to sterilize the slicer parts. In locations where the air in the room is also sterilized by ultra violet radiation and therefore having a low bacteria and spore count, the interval between energization may be lengthened, in others, especially in location where the mold spore count is exceptionally high this period may be shortened and/or the length of time the ray emitting tubes are energized may be lengthened.

The embodiments of the invention herein shown and described are to be regarded as illustrative only, and it is to be understood that the invention is susceptible to variation, modification and change within the spirit and scope of the subjoined claims.

Having described the invention, I claim:

1. In a slicing machine, in combination, a bracket, a rotary slicing knife mounted upon said bracket, a motor for rotating said rotatable slicing knife, a plurality of ultra violet ray emitting tubes mounted adjacent said knife, means for directing rays emitted by said tubes against portions of the sides of said knife, a current source, a circuit connecting said motor with said current source and said ray emitting tubes with said current source, a manipulative means for closing said circuit and thereby energizing said tubes and said motor to cause said motor to rotate said knife at a high rate of speed and means connectable into said circuit for periodically causing said motor to rotate said slicing knife at a low rate of speed and for energizing said tubes while said motor is so rotating, said means in said circuit for causing said motor to rotate at a low rate of speed including an electric timing device.

2. In a slicing machine, in combination, a bracket, a rotary slicing knife mounted upon said bracket, a motor for rotating said rotatable slicing knife, a plurality of ultra violet ray emitting tubes mounted adjacent said knife, means for directing rays emitted by said tubes against portions of the sides of said knife, a current source, a circuit connecting said motor with said current source and said ray emitting tubes with said current source, a manipulative means for closing said circuit and thereby energizing said tubes and said motor to cause said motor to rotate said knife at a high rate of speed and means connectable into said circuit for automatically energizing said motor to periodically rotate said slicing knife at a low rate of speed and to simultaneously energize said tubes after de-energization by said manipulative means.

3. In a slicing machine, in combination, a rotatable knife, a motor for rotating said knife at high speed, means emitting rays having bactericidal action, means for directing such rays against portions of the sides of said knife, a current source, an electric circuit connecting said ray emitting means with said current source and means in said circuit, comprising a timing device, for periodically rotating said knife at low speed and simultaneously energizing said ray emitting means.

4. In a slicing machine, in combination, a rotatable knife, means emitting rays having bactericidal action, means for directing such rays against portions of the sides of said knife, a current source, an electric circuit connecting said ray emitting means with said current source and means in said circuit for periodically rotating said knife and simultaneously energizing said ray emitting means.

5. In a slicing machine, in combination, a rotatable slicing knife, means for emitting ultraviolet light upon a portion of said knife, automatically operated means acting at intervals for rotating said knife to bring other portions thereof into the path of said light and simultaneously energizing said ultra-violet light emitting means, and timing means for controlling the intervals at which said automatic means acts.

GEOFFREY R. BENNETT.